UNITED STATES PATENT OFFICE 2,627,438

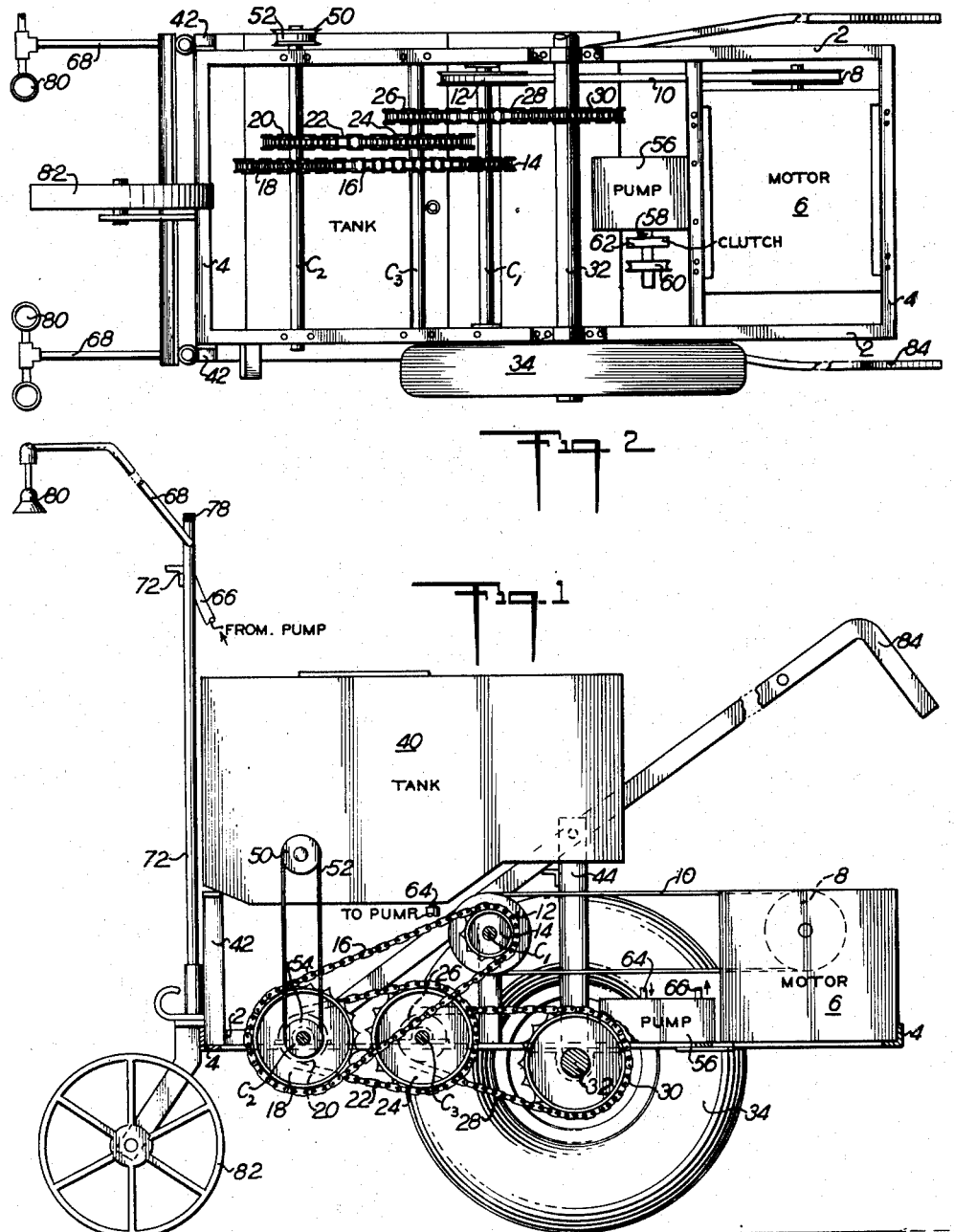

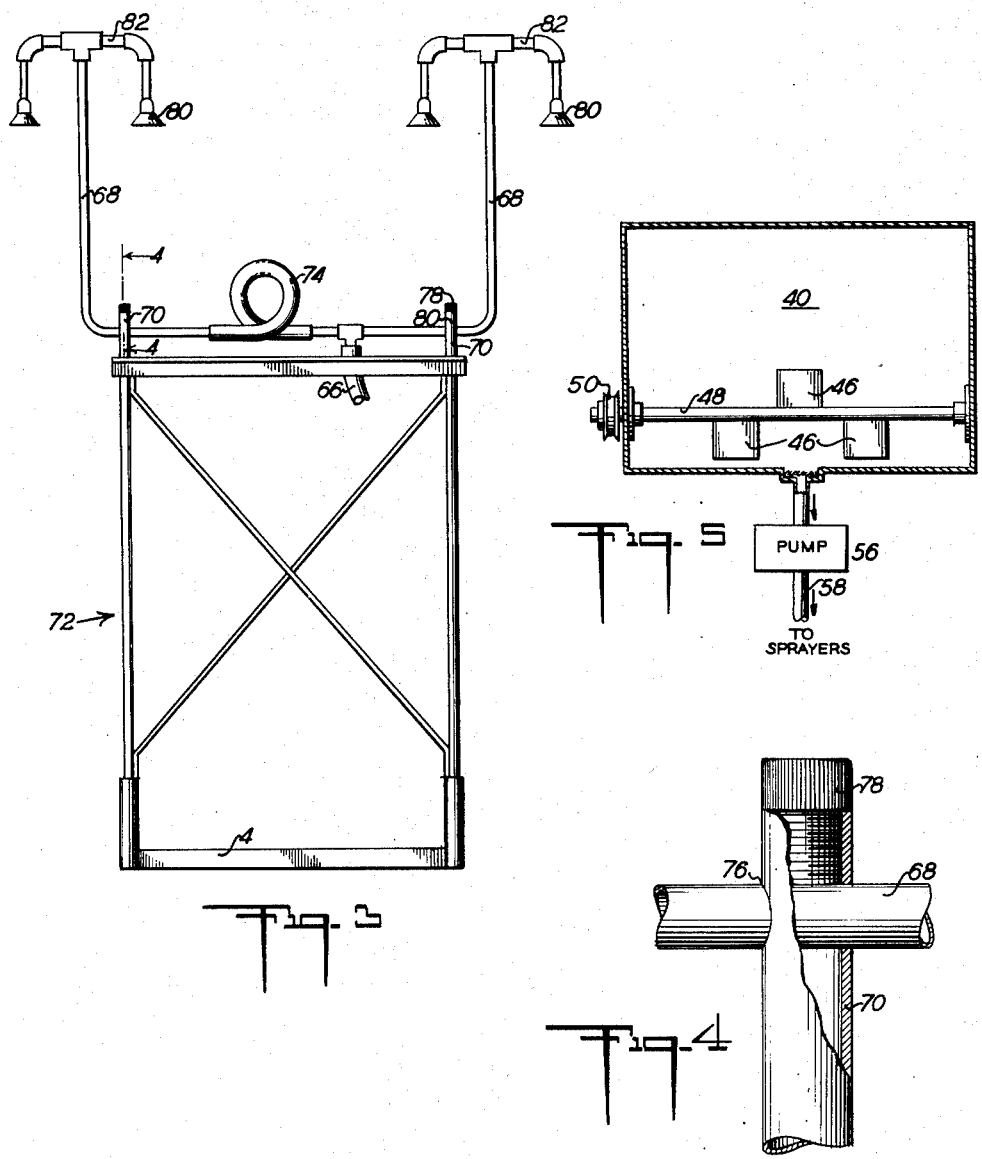

POWER-OPERATED SPRAYER FOR PLANTS

William S. McNair, Fayetteville, N. C.

Application January 11, 1952, Serial No. 265,982

2 Claims. (Cl. 299—45)

This invention is a power operated, manually steered sprayer, particularly useful for spraying tobacco plants, but capable of use in spraying plants generally.

The invention comprises a main frame, provided with a driver axle, carrying a pair of load carrying and driving wheels, positioned at an intermediate portion of the frame. Steering and control handles are carried by the frame, extending upwardly and backwardly. The main frame carries a plurality of countershafts, each countershaft having thereon a driven and a driving sprocket, connected in series, for forming a speed reducing drive. The frame also carries a tank for sprayer solution, and spray pipes and spray nozzles.

The foregoing parts form a machine of considerable weight. One of the objects of the invention is to provide a counter-balanced machine, which, in spite of the weight of the parts, may readily be controlled manually by said control handles. To this end, one of the heavier elements, such as the motor, is mounted on the frame, to the rear of the main supporting axle; the two other heavier portions of the machine are the series of countershafts and the tank for the spraying solution and these are mounted on the frame ahead of the main supporting axle. The countershafts and their driving chains and the solution tank are thereby more or less counter-balanced by the relatively heavy motor, bringing the center of gravity of the machine as near as possible to, but not necessarily coincident with, the main supporting axle. The pump, driven by the motor, is also preferably to the rear of the main supporting axle.

Another object of the invention is to provide an improved speed reducing drive, comprising a series of transversely extending countershafts, the first of the series being driven by the motor, each countershaft having a large driven sprocket and a smaller driving sprocket thereon, the smaller driving sprockets being respectively connected to the larger driven sprockets, for thereby forming a speed reducing drive, which drives the driving wheels, the pump and agitator blades in the solution tank.

The front of the machine is provided with laterally extending spray pipes and spray nozzles which are variably positionable vertically and laterally, in accordance with the type and size of plants being sprayed, and the distance between the rows of plants.

The invention will be further described in connection with the accompanying drawings, illustrating the preferred embodiment of the invention.

In the drawings:

Fig. 1 is a side elevation of the sprayer of this invention;

Fig. 2 is a bottom view of the same;

Fig. 3 is a vertical side view of the spray pipes and their supports;

Fig. 4 is an enlarged section on the line 4—4 of Fig. 3; and

Fig. 5 is a vertical cross section of the solution tank.

Referring now to the drawings, the main frame comprises side members 2 and end members 4, preferably of angle iron. Positioned at the rear of the frame is a gasoline motor 6, driving a pulley or sprocket 8, which in turn drives a belt 10. Belt 10 drives a large pulley 12 on first countershaft $C_1$; $C_1$ carries a small sprocket 14 which drives chain 16, which in turn drives large sprocket 18 on second countershaft $C_2$; $C_2$ carries a smaller sprocket 20 which drives chain 22 which in turn drives large sprocket 24 on a third countershaft $C_3$; $C_3$ carries a smaller sprocket 26 which drives chain 28 which in turn drives main driving sprocket 30 on the main driving and load carrying axle 32. The foregoing parts evidently form a speed reducing drive, positioned ahead of the main axle 32.

Main axle 32 is positioned at an intermediate portion of the main frame and is provided at opposite ends with driving and load carrying wheels 34.

A solution tank 40 is positioned in any convenient manner on the frame, as by front and rear supports 42 and 44. This tank, for the most part, is positioned ahead of main axle 32. The tank is provided with agitator blades 46, on shaft 48, driven by pulley wheel 50, in turn driven by belt 52 driven by pulley wheel 54 on countershaft $C_2$.

The frame also carries a pump diagrammatically shown at 56, of the reciprocating or centrifugal type, driven by shaft 58 and pulley or sprocketwheel 60. Wheel 60 is driven in any convenient way, not shown, directly from the motor, or by a belt or chain from one of the countershafts $C_1$, $C_2$ or $C_3$. A clutch 62 may be provided for disconnecting the pump, as when the sprayer is traveling on the road.

The pump 56 is connected to the solution tank by pipe 64. Leading from the pump is a pressure pipe 66, which is connected to spray pipes 68, supported by brackets 70, on a frame 72 carried at the front end of the main frame. Spray pipes 68 are interconnected by a flexible loop 74, whereby they may be laterally adjusted, for spraying rows of plants of different widths.

Brackets 70, Fig. 4, may be in the form of pipes having holes 76 through which pipes 68 pass loosely, for lateral adjustment, the upper parts of brackets 70 being internally threaded to receive set screws 78 for clamping pipes 68 in adjusted position. This mounting of the spray pipes permits the lateral adjustment just described, and also turning them about horizontal axes—the axes of holes 76. Spray pipes 68 are provided with the usual spray nozzles 80. The short pipes 82 for the spray nozzles 80 are not rigidly held, being frictionally held that they may be rotated and adjusted about a horizontal axis, for thereby varying the angle of the spray from nozzles 80.

The front of the main frame is provided with the usual leader wheel 82.

The main frame is also provided with upwardly and backwardly extending control handles 84.

The motor, which is fairly heavy, is mounted to the rear of the load and driving axle 32, while the countershafts, their driving and driven sprockets and chains, and the solution tank are mounted ahead of the axle, thereby achieving a counterbalanced effect, and putting the center of gravity of the machine in the vicinity of, but not necessarily in line with, axle 32. Since the machine is manually controlled, as by the handles 84, this balanced effect greatly facilitates such manual control.

While the invention has been described in some detail, it should be understood that the invention is not limited to the exact details shown. The term driving belts is understood to cover driving chains, and vice versa, and the term driving pulleys is understood to cover driving sprockets, and vice versa.

I claim as my invention:

1. A power operated sprayer, comprising a chassis frame, control handles carried by said frame, a main horizontal transversely extending driving axle carried by said frame, at an intermediate portion thereof, a pair of load carrying and driving wheels on said axle, a tank for sprayer liquid carried by said frame, a series of horizontal transversely extending countershafts carried by said frame, each countershaft having a large driven sprocket and a smaller driving sprocket, said countershafts being positioned below said tank, a belt for driving the first countershaft in the series, sprocket chains respectively connecting the driven sprocket of one countershaft to the driving sprocket of the next countershaft for forming a speed reducing drive, a sprocket chain for connecting the last driving sprocket in the series to said driving axle for driving the driving wheels, a motor carried by said chassis for driving said belt for driving the first countershaft; a pump, operatively connected with said tank; spray pipes and spray nozzles, operatively connected with said pump; a leader wheel carried by said chassis frame; said spray pipes and nozzles, said leader wheel, said tank and said countershafts being positioned on said chassis frame ahead of said main axle, said motor and said pump being positioned on said chassis frame to the rear of said main axle, adjacent the outer ends of said control handles, whereby a counterbalanced effect is achieved and manual steering and operation by said control handles is facilitated.

2. A power operated sprayer as set forth in claim 1 including an agitator positioned within said tank and pulley means driven by one of the countershafts for operating said agitator.

WILLIAM S. McNAIR.

REFERENCES CITED

The following references are of record in the file of this patent:

UNITED STATES PATENTS

| Number | Name | Date |
|---|---|---|
| 1,759,988 | Knapp | May 27, 1930 |
| 2,090,929 | Boyett | Aug. 24, 1937 |
| 2,243,597 | Elliott | May 27, 1941 |